United States Patent
Soltz

[15] 3,661,089
[45] May 9, 1972

[54] CONTROL SYSTEM EMPLOYING HALL-EFFECT DEVICES

[72] Inventor: Daniel J. Soltz, Norristown, Pa.
[73] Assignee: Eaton Corporation, Cleveland, Ohio
[22] Filed: Mar. 3, 1970
[21] Appl. No.: 16,023

[52] U.S. Cl. ................................104/88, 246/2 E, 324/45
[51] Int. Cl. ...........................................................B61k 1/00
[58] Field of Search............................324/45; 104/88; 246/2; 307/236; 328/118

[56] References Cited

UNITED STATES PATENTS

| | | | |
|---|---|---|---|
| 3,382,377 | 5/1968 | Huffman et al. | 307/236 |
| 3,080,550 | 3/1963 | Kuhrt | 324/45 X |
| 3,373,391 | 3/1968 | Böhm et al. | 324/45 X |

Primary Examiner—Arthur L. La Point
Assistant Examiner—George H. Libman
Attorney—Yount and Tarolli

[57] ABSTRACT

An automated vehicle which moves along a path is to perform certain tasks at predetermined locations along the path in accordance with codes sensed by a code reader from code magnets located at sensing stations along the path. The code reader contains a number of Hall-effect devices for sensing the orientation of the code magnets. The voltage output of each Hall-effect device is coupled to a differential amplifier. The output of each differential amplifier is coupled to a first threshold circuit which produces a first logic level signal when the output of the differential amplifier has a positive polarity and to a second threshold circuit which produces a second logic level signal when the output of the differential amplifier has a negative polarity. A pulse generator may be coupled to a pulse driving circuit to supply current pulses to the Hall-effect devices so that the sensitivity of the Hall-effect devices is increased.

4 Claims, 3 Drawing Figures

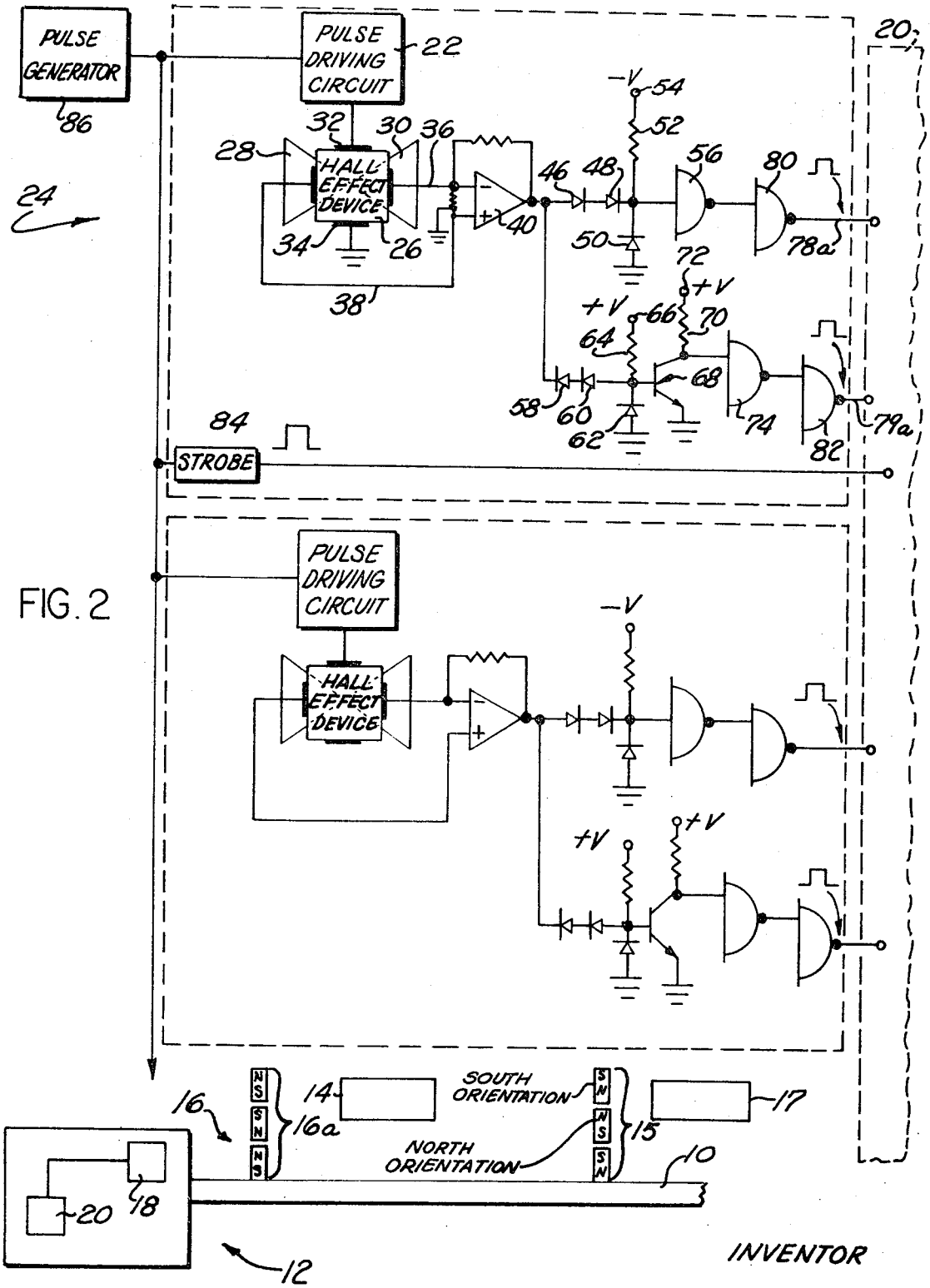

CONTROL SYSTEM EMPLOYING HALL-EFFECT DEVICES

Driverless tractors, automated warehousing stacker cranes, and other automated vehicles are directed or controlled to perform certain operations as the automated vehicle moves along a path. A controllable means is provided to effect the direction or the desired control of the vehicle. The controllable means is in turn under the control of command codes which are sensed at various sensing stations by a code sensing system along the path. The code sensing system which is employed should be reliable, relatively uncomplicated and inexpensive and the cost of the code members should be low. In addition, it is highly desirable that the code sensing system supply logic level signals which may be utilized by control circuitry which employs conventional digital error detecting circuit techniques.

Code sensing systems which include photoelectric code readers may provide logic signals for the control of automated vehicles. However, this type of code reader is not reliable in certain environments such as warehouses and factories where a considerable amount of dirt and dust may be present. Magnetic reed switches may also be employed in code sensing systems to sense the presence of magnetic code elements at a sensing station, but a relatively high magnetic field is necessary to actuate a magnetic reed switch, and the switches themselves are unreliable at times due to fouled contacts. In addition, the magnetic code elements which are employed in a magnetic reed switch system are relatively expensive because of the high magnetic field that must be generated.

It is an object of the present invention to provide a code sensing system for controlling a movable vehicle in which at least one magnetic code element is sensed by a sensing means which employs at least one Hall-effect device, and the sensing means produces two logic level signals for each sensing stage which are used to control the operation of the movable vehicle and which may be conveniently employed by an error detecting circuit.

It is another object of the present invention to provide a code sensing system for controlling a movable vehicle in which a plurality of magnetic code elements are sensed by a sensing means which employs a plurality of Hall-effect devices and signals from the sensing means are simultaneously coupled to a decoding and control device which selectively controls the operation or the motion of the movable vehicle, the Hall-effect devices preferably being activated by a pulse of current, and a gate pulse preferably being employed to gate the signals from the Hall-effect devices to the decoding and control device.

It is a further object of the present invention to provide a code sensing system for controlling a movable vehicle in which at least one magnetic code element is sensed by a sensing system which employs at least one Hall-effect device, and the output of each Hall-effect device is coupled to a differential amplifier which produces a negative polarity output signal if the associated magnetic code element has a first orientation and a positive polarity output signal if the associated magnetic code element has a second orientation, and the negative and positive polarity output signals from the amplifier are converted to logic level signals which appear on separate output lines.

Other objects and advantages of the disclosed invention will be apparent from the description of a preferred embodiment and the accompanying drawings in which:

FIG. 1 is a diagrammatic view representative of an automated vehicle which carries a plurality of Hall-effect devices that are capable of sensing codes from magnetic code elements which are located at sensing stations along the path of the automated vehicle;

FIG. 2 is a combined block diagram and schematic of the code reader of the disclosed embodiment and FIG. 3 is a schematic diagram showing the outputs of the pulse generator, the strobe circuit, and the first and second sensing stages.

Figure 3:
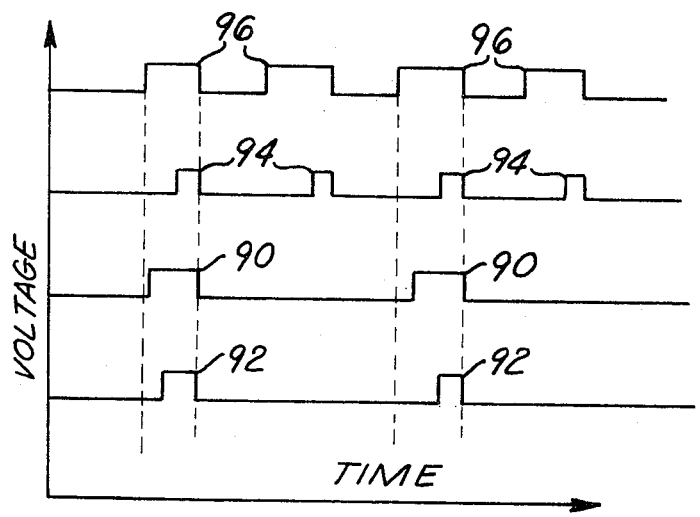

FIG. 1 shows an automated vehicle 12 which, for example, may be a driverless tractor or an automated stacker crane in a warehousing system which moves along a path 10. As the automated vehicle 12 moves along the path 10, it is directed to perform certain tasks in response to command signals. The command signals are received by a conventional control system 20 from a code reader 18 which senses the code that is established by the orientation of magnetic code elements 16 which are stacked lengthwise at a sensing station. The code established by the orientation of the magnetic code elements 16 will be sensed by the code reader 18 when the automated vehicle 12 is at or passes over the magnetic code elements 16, and this code may be used to direct the control system 20 so that the automated vehicle 12 is directed to a first station 14 where the vehicle 12 may stop or may perform a task. For example, if the automated vehicle 12 is a driverless tractor, then material may be loaded from the vehicle 12 to a storage bin at the station 14 or, conversely, material may be unloaded from the storage bin onto the vehicle 12 at the station 14. The control system 20 may then direct the vehicle 12 from the first station 14 to a second station 15 where a command signal is received which may direct the vehicle to a new station, such as the station 17, for example.

The control system of the disclosed invention may obviously be employed to control a variety of automated devices and is not limited to use with driverless tractors. The magnetic code elements 16 can alternately be carried by the automated device and the code reader 18 can be located at a stationary position, if desired.

The orientation of the code magnets 16 establishes a command code signal which is utilized by the control system 20 to control the automated vehicle 12. The code reader 18 of FIG. 1, which is employed to sense the code established by the magnetic code elements 16, is shown in the combined block diagram and the schematic of FIG. 2. The code reader 18 consists of a number of states which are equal in number to the number of magnetic code elements 16. Every stage has a Hall-effect device which is used to sense the orientation of an associated magnetic code element 16.

Each Hall-effect device is formed of a thin strip of suitable material and the plane of the Hall-effect device is positioned so that the magnetic field established by its associated magnetic code element 16 passes through the Hall-effect device in a plane perpendicular to it. The Hall-effect devices are each located adjacent to two triangular shaped magnetic field concentrators, with the pointed ends of the two associated triangular shaped concentrators being located adjacent to one another on opposite sides of their respective Hall-effect device. The magnetic field concentrators are made of feromagnetic material and are employed to increase the sensitivity of the Hall-effect device to the magnetic field that is established by the associated magnetic code element 16. For example, a Hall-effect device 26 of the first sensing stage 24 of the code reader 18 is located adjacent to triangular shaped magnetic field concentrators 28 and 30, which are employed to concentrate the magnetic field that is associated with the magnetic code element 16a of FIG. 1.

Hall-effect devices may be formed of strips of various materials. When an electric current is passed longitudinally in one direction to the strip of material, an electric potential is developed across opposite edges of the strip in a direction perpendicular to the flow of electric current if the strip is placed in a magnetic field which is perpendicular to the plane of the strip. Materials, such as antimony, cobalt, zinc or iron produce a potential of one polarity and materials, such as gold, silver, platinum, nickel, bismuth, copper and aluminum produce a potential of the opposite polarity when the direction of the applied current flow and the direction of the magnetic field is the same for Hall-effect devices made of both groups of material.

Hall-effect devices may also be formed of various semiconductor materials and, although a Hall-effect device which is formed of any material may be employed in the present invention, it is preferred that a semiconductor device be employed.

Suitable semiconductor Hall-effect devices may be formed of idium arsenide or indium antimonide.

The polarity of the magnetic code element 16 which is being sensed is detected by an associated difference amplifier which is coupled to the electrodes of the Hall-effect device across which the Hall-effect voltage is developed. For example, a difference amplifier 40 of the first sensing stage 24 is coupled across electrodes 36 and 38 of the Hall-effect device 26. When the associated magnetic code element 16a has a first orientation, the output of the difference amplifier 40 will be at a positive potential. If the orientation of the magnetic code element 16a is turned through 180° to a second orientation, the output of the difference amplifier 40 will go to a negative potential when the orientation of the magnetic code element 16a is sensed.

The present invention may be implemented as shown in FIG. 2 by coupling an actuating pulse of current through terminals of the Hall-effect device such as the terminals 32 and 34 of the Hall-effect device 26 from a pulse driving circuit 22 which is coupled to the pulse generator 86. The application of a pulse to the Hall-effect devices of the code reader increases their sensitivity.

An alternate embodiment of the present invention may be provided if the Hall-effect devices have adequate sensitivity without being pulsed merely be removing the pulse driving circuit 22, the pulse circuit 84 and the pulse generating circuit 86 and by coupling a DC source across the actuating terminals, such as the terminals 32 and 34 of the Hall-effect device 36 for example, with a DC voltage across the terminals 32 and 34. The activating current for the Hall-effect device 26 may have a lower magnitude than that supplied by pulse driving circuit 22 in the pulse driven embodiment if the Hall-effect device 26 has a sufficiently high sensitivity.

The output of a difference amplifier 40 is coupled to two threshold circuits, one of which is a positive voltage threshold circuit, and the other of which is a negative voltage threshold circuit. The positive voltage threshold circuit is formed by a resistor 52, which is coupled to a terminal 54, and by diodes 46, 48, and 50. The negative voltage threshold circuit is formed by a resistor 64, which is coupled to a terminal 66, and by diodes 58, 60 and 62.

When the output of the difference amplifier 40 is approximately 0 volts, the voltage at the junction point of the cathodes of the diodes 48 and 50 will be approximately −0.6 volts and the diodes 46 and 48 will not conduct. Similarly, when the output of the difference amplifier is at approximately 0 volts, the junction point of the diode 62 and the anode of the diode 60 will be at approximately +0.6 volts and the diodes 58 and 60 will not conduct. A NPN transistor 68 will then be turned on due to the current flowing through the resistor 64 from the positive voltage supply which is connected to the terminal 66. The collector of the transistor 68 is connected to a load resistor 70, which is connected to a terminal 72 which is coupled to a positive voltage power supply. When the transistor 68 is on its collector will be at approximately +0.5 volts.

The gates 56, 74, 80 and 82 supply logic level output signals to the control system 20 on output lines 78a and 79a. These signals represent either a "North" or a "South" orientation of the associated magnetic code 16a, the "North" and "South" orientations being 180° displaced from one another, as shown in FIG. 1. The gates 56, 74, 80 and 82 are constructed so that they produce a logic level "0" output signal whenever the input signal to these gates is less than a predetermined positive potential. Therefore, when the output of the difference amplifier 40 is at approximately 0 volts, the gate 56 will produce a logic level "1" output signal and this signal will be logically inverted by the gate 80 which produces a logic level "0" output signal.

Although a small positive voltage appears on the collector of the transistor 68, when the transistor 68 is in a saturated conducting state this voltage is insufficient to drive the gate 74 from its logic level "1" state to its logic level "0" state and, therefore, the output of the gate 82 will also be at a logic level "0". However, when the Hall-effect device 26 senses one orientation of the magnetic code element 16a, the output of the difference amplifier 40 will be driven to one polarity or the other. For example, if a sufficiently positive voltage appears on the output of the difference amplifier 40 so that the diodes 46 and 48 are conducting and so that the gate 56 is driven to a logic level "0" state, a first orientation of the magnet 16a is indicated. When the gate 56 is at a logic level "0" state, the output of the gate 80 is at a logic level "1" state, and this signal is coupled on the line 78 to the control and error detecting system 20. When the output of the difference amplifier 40 is at a positive potential level, the diodes 58 and 60 remain nonconducting and the transistor 68 remains in a conducting state. Thus, the output of the gate 74 remains at a logic level "1" and the output of the gate 82 remains at a logic level "0" when the magnet 16a is oriented in the first direction.

If the Hall-effect device 26 were to sense the opposite orientation of the magnetic code element 16a, then the difference amplifier 40 would produce a negative potential output signal which has a sufficient magnitude to allow the diodes 58 and 60 to conduct to thereby turn off the transistor 68. When the transistor 68 is turned off, the positive voltage which is coupled to the terminal 72 drives the gate 74 to a logic level "0" state, and this logic level state is inverted by the gate 82 which produces a logic level "1" signal on the output line 79a. A negative polarity output signal from the difference amplifier 40 maintains the diodes 46 and 48 non-conducting. Therefore, the output of the gate 56 is at a logic level "1" and the output of the gate 80 is at a logic level "0" when the magnet 16a is oriented in the second direction.

Should the logic level gates 80 and 82 both supply logic level "1" signals on the output lines 78a and 79a to the control system 20, a sensing error will have occurred. The control system 20 preferably includes error detecting circuitry to detect the occurence of two simultaneous logic level "1" output signals from the same sensing stage. The control system 20 also preferably includes error detecting circuitry to provide an error signal whenever one or more of the sensing stages of the code reader fails to indicate that its associated magnet code element at a sensing station has been sensed while at the same time one or more of the sensing stages do provide such an indication.

The various sensing stages of the code reader 18 produce logic level output pulses when pulsed signals are applied to the Hall-effect devices to increase their sensitivity. The output pulses of the first and second sensing stages are illustrated as 90 and 92 respectively in FIG. 3. These pulses 90 and 92 are initiated at different times due to variations in magnetic field strengths of their associated magnetic code elements 16 and also due to the different response characteristics of the various sensing stages. A pulse circuit 84, which has its input coupled to the pulse generator 86 and its output coupled to gating circuitry in the control system 20, is provided to produce a delayed gate pulse 94 so that these variations do not cause sensing errors. The gate pulse 94 has a duration that is shorter than the duration of the logic level pulses 90 and 92 emitted by the sensing stages and the gate pulse 94 is delayed so that it occurs at a time when all of the logic level output signals from the various sensing stages of the code reader 18 are at the logic level required by the control system 20. The output of the pulse generator 86 is in the form of the pulses 96. Generally, the time that the Hall-effect devices are over the magnetic code elements 16 is greater than or equal to the time represented by the width of the output pulses 96. It should be apparent from FIG. 3 that the gate pulse 94 is delayed so that the output of the sensing stages represented by the pulses 90 and 92 are at their correct logic levels. Clearly, if the output of the sensing stages was read at the leading edge of the pulse 90 the control would get an incorrect indication due to the fact that the pulse 92 would not be at its correct logic level. Thus, the gate pulse 94 is provided so that variations in the output pulses from the sensing stages do not cause sensing errors.

While an embodiment of the present invention has been shown and described it will be understood that the fundamental features of the present invention may be utilized in various other embodiments by those skilled in the art without departing from the scope of this invention.

What is claimed is:

1. In a system having a vehicle movable along a path, means for performing a control operation comprising first and second means, one of said first and said second means being mounted along said path and the other of said first and said second means being mounted on said vehicle for movement therewith, said first means comprising magnetic means for magnetically storing a plurality of binary code bits, said second means comprising a plurality of Hall-effect means for sensing said binary code bits from said magnetic means at substantially the same time, activating means for activating said Hall-effect means with a pulse of activating current by providing pulsed electrical signals as said bits of said binary code are being sensed by said Hall-effect means, sensing means responsive to Hall-voltages produced by said Hall-effect means for providing electrical signals representative of said binary code bits, control means responsive to binary signals for performing a control operation in dependence on the binary code bits stored by said first means, first gate means responsive to said sensing means for establishing binary signals indicative of said bits of said binary code and directing said binary signals to said control means, and second gate means responsive to said activating means for producing a gate pulse which is initiated a predetermined time after said pulse of activating current is initiated for gating the binary signals to the control means.

2. In a control system as set forth in claim 1, wherein said first gate means includes means coupled to the plurality of Hall-effect means for producing a first set of electrical signals of a first logic level which are representative of the logical "1" bits of said binary code bits and for producing a second set of electrical signals of said first logic level which are representative of the logical "0" bits of said binary code bits.

3. A method of providing a control means for controlling a vehicle which is movable along a path with coded control information from magnetic means which stores said coded control information comprising the steps of positioning a plurality of Hall-effect means in a magnetic-coupling relationship with said magnetic means, activating said Hall-effect means at substantially the same time by means of a pulse of activating current, producing a plurality of electrical signals in response to the Hall-voltages that are produced by said activated Hall-effect means, directing said electrical signals to said control means while said Hall-effect means are activated, and initiating a gate pulse to said control means a predetermined time after said pulse of activating current is initiated for gating the electrical signals to the control means.

4. A method of providing a control means for controlling a vehicle which is movable along a path with coded information from magnetic means which stores said coded control information as set forth in claim 3 comprising the step of transforming each of said Hall-voltages into a logic level "1" electrical signal on one output line of an associated pair of output lines to said control means and a logic level "0" electrical signal on the other output line of the associated pair of output lines to said control means, the relationship of said logic level electrical signals on said pair of associated output lines being representative of the polarity of said associated Hall-voltage.

* * * * *